United States Patent

[11] 3,578,956

[72] Inventor Amiel J. McCall
     South Euclid, Ohio
[21] Appl. No. 824,065
[22] Filed May 13, 1969
[45] Patented May 18, 1971
[73] Assignee Allen-Bradley Company
     Milwaukee, Wis.

[54] PHASE MODULATOR OF TWO DYNAMIC COUNTERS
     9 Claims, 6 Drawing Figs.
[52] U.S. Cl. .................................................. 235/92cc,
                                              340/168B, 178/69.5R
[51] Int. Cl. ...................................................... G06m 3/08
[50] Field of Search............................................. 235/92
     (70); 340/170, 168, 146.1, 146.2; 178/69.5, 53.1;
                                                         328/63, 133

[56]             References Cited
            UNITED STATES PATENTS
2,980,858  4/1961  Grondin et al................  178/69.5
3,440,547  4/1969  Houcke.........................  178/69.5
3,454,926  8/1969  Kinzelman....................  340/168

Primary Examiner—Thomas A. Robinson
Attorneys—Arnold T. Ericsen and Richard C. Steinmetz, Jr.

ABSTRACT: A digital system controls the relative phase of the outputs of two dynamic counters by modulating the input train of pulses to one counter until the two counters are accurately in phase. In the system, successively releasable coarse, medium, and fine in-phase detectors, operating at successively higher frequencies, are employed to permit modulation to occur until the desired in-phase accuracy is obtained. The coarse in-phase detector first detects an in-phase condition causing release of the medium in-phase detector, which next detects an in-phase condition causing release of the fine in-phase detector which provides the final in-phase detection that terminates the modulation. During the entire modulation period, a lead-lag detector controls the direction in which the input train of pulses to the one counter is modulated.

INVENTOR.
AMIEL J. McCALL

INVENTOR.
AMIEL J. McCALL
BY Lindenberg & Freilich
ATTORNEYS

PHASE MODULATOR OF TWO DYNAMIC COUNTERS

This invention relates to a system for controlling the relative phase of the outputs of two equal-length dynamic counters.

In digital systems, such as a numerically controlled machine tool, it is sometimes required to modulate the input to one counter until its output is accurately in phase with the output of a second counter. While there are various ways of providing such operation, it is highly desirable that the means employed for this purpose be simple, reliable and accurate.

Accordingly, an object of the present invention is to provide a simple and reliable system for controlling the modulation of the input to one of two digital counters for bringing its output into accurate phase with the output of the other counter.

Another object of the present invention is to provide improved logical circuit means for implementing the system of the foregoing object.

The above objects are accomplished in accordance with an exemplary embodiment of the invention by the use of a system employing a plurality of successively releasable in-phase detectors operating at successively higher frequencies which provide simple and reliable phase detection without ambiguity so as to permit modulation of the input of one of two equal-length digital counters to occur until the outputs of the two counters are within the desired phase accuracy.

The novel features that are considered characteristic of this invention are set forth with particularity in the appended claims. The invention will be understood from the following description of an exemplary embodiment taken in connection with the accompanying drawings, in which:

Like numerals refer to like elements throughout the FIGS. of the drawings.

Figure 1:
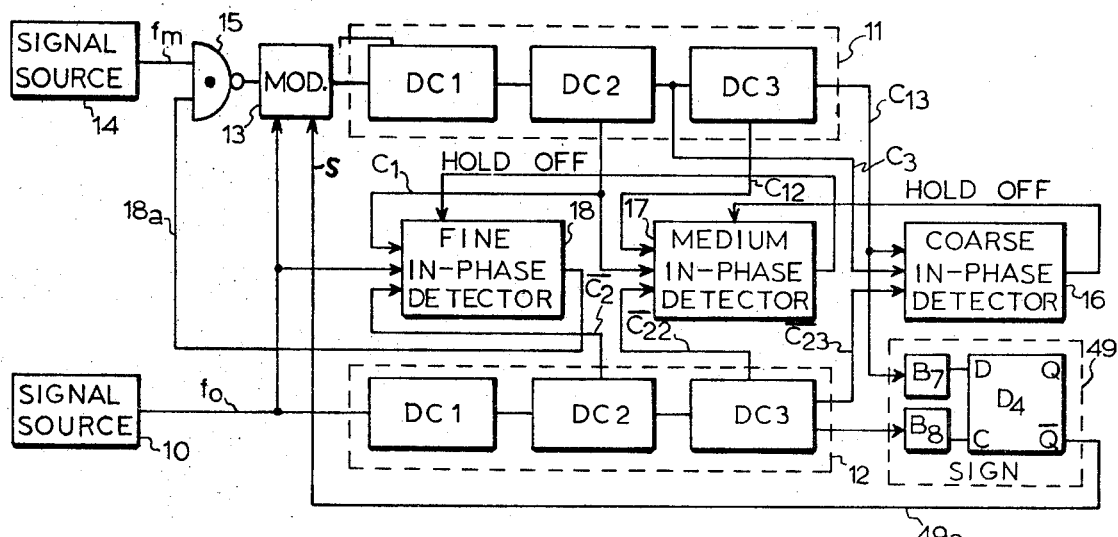
FIG. 1 is a block diagram of a system embodying the present invention.

Referring to FIG. 1, a source 10 which provides a pulse train signal at a frequency $f_o$ is employed to advance a pair of digital dynamic counters 11 and 12. Each is shown as typically comprising three decade counters DC1, DC2, and DC3 connected in cascade. Each of the decade counters may be a binary counter of any number of binary stages. Obviously, other types of counters and/or stages may be used. The output of each decade counter is a signal at a frequency one-tenth the frequency of a signal at its input. Signals at intermediate frequencies may also be derived from each decade counter at internal points of its circuit in a conventional manner.

The source 10 is connected to the counter 11 through a modulator 13, which also receives a pulse train signal at a frequency $f_m$ from a second source 14 via a NAND gate 15 which is enabled when modulation is required to bring the counter 11 into phase with the counter 12. It is to be noted that NAND logic is used in the illustrative logical implementations described herein, but obviously other types of logic could also be used. It is also to be noted that a NAND gate is also used to provide an inversion function where required. This may be accomplished in a conventional manner, such as by making all inputs true except the one which is to receive the signal to be inverted.

The modulator 13 operates to modulate the input to the counter 11, using pulses of frequency $f_m$ from the second source 14 applied via the NAND gate 15, until a fine phase detector 18 detects that an in-phase condition of the desired accuracy has been achieved between the two counters 11 and 12. The output 18a from the fine phase detector 18 then becomes false to disable the NAND gate 15 and thereby terminate the modulation. The modulator 13 operates to either advance or retard the phase of the counter 11 in response to a signal S on an output 49a of a sign circuit 49 which indicates the sign of the phase difference between the counters 11 and 12. For example, it will be assumed that signal S is true when the phase of the output of the counter 12 leads the output of the counter 11 and false when lagging.

Figure 2:
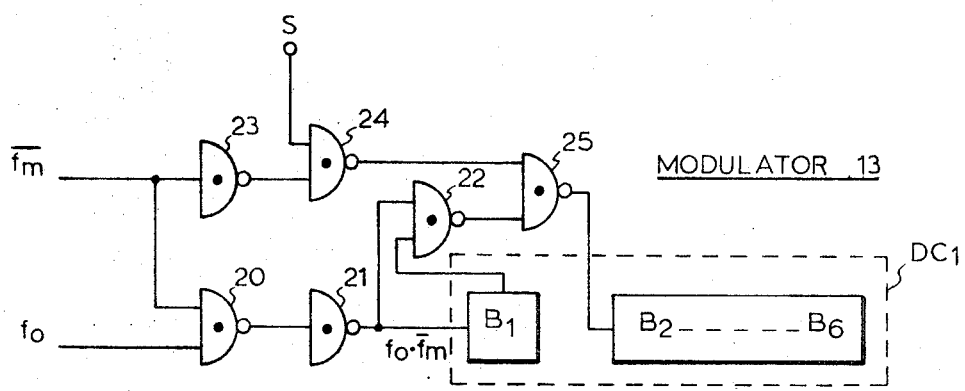
FIG. 2 is a logic diagram of a modulator for the system of FIG. 1.
Figure 3:
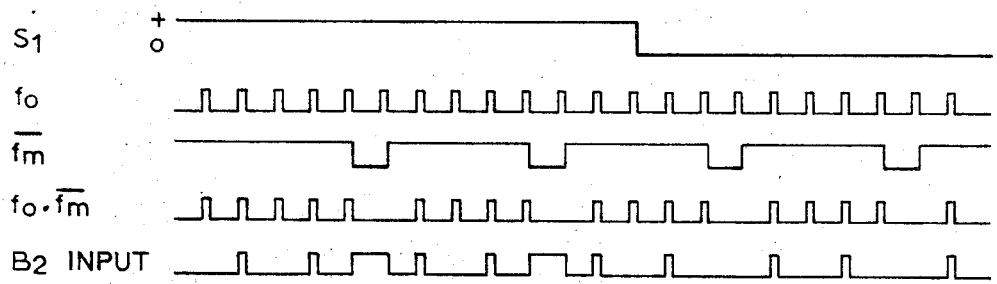
FIG. 3 is a timing diagram illustrating the operation of the modulator of FIG. 2.

FIG. 2 illustrates an exemplary modulator 13 capable of advancing or retarding the phase of the counter 11 of FIG. 1. It is to be understood that the inputs $f_o$ and $\overline{f_m}$ in FIG. 2 respectively correspond to the outputs of the signal source 10 and the NAND gate 15 in FIG. 1. Typical $f_o$ and $\overline{f_m}$ pulse trains are shown in FIG. 3. NAND gates 20 and 21 operate jointly (NAND gate 21 operating as an inverter) to provide the AND function $f_o \cdot \overline{f_m}$ at the input of the first stage $B_1$ in the decade counter DC1 of the counter 11 (FIG. 1). Thus, the input to the first stage $B_1$ of the decade counter DC1 is a train of pulses corresponding to the signal $f_o$, with one pulse deleted for each pulse of the signal $f_m$ as illustrated by the typical $f_o \cdot \overline{f_m}$ pulse train shown in FIG. 3.

As is conventional, the first stage $B_1$ produces an output pulse for every two pulses produced by the pulse train $f_o \cdot \overline{f_m}$ applied thereto from the NAND gate 21. Accordingly, a NAND gate 22 which receives the $f_o \cdot \overline{f_m}$ pulse train and the output from the first stage $B_1$ will pass only every other pulse of the $f_o \cdot \overline{f_m}$ pulse train.

Still referring to FIG. 2, it will be seen that a NAND gate 25 receives the output of the NAND gate 22 and also the output of a NAND gate 24 which in turn has the sign signal S applied thereto (from the sign circuit 49 in FIG. 1) and the $\overline{f_m}$ pulse train applied thereto via a NAND inverter 23. The resulting output of the NAND gate 25 which forms the input of the next stage $B_2$ of the counter DC1 is thus representable in Boolean algebra form as follows:

$B_2$ INPUT $= S \cdot f_m + f_o \cdot \overline{f_m} \cdot B_1$

It will be remembered that the signal S is true (i.e., a binary 1) when the phase of the output of the counter 12 leads that of the counter 11 and false (i.e., a binary 0) when lagging. The leading situation for which S is 1 will be considered first with reference to the left side of FIG. 3. The resulting input to $B_2$ in accordance with the above equation is correspondingly shown by the left side of the bottom graph in FIG. 3, from which it will be seen that the $f_m$ pulses have been interjected into the $B_1$ pulse train (which is every other pulse of $f_o \cdot \overline{f_m}$), thereby causing advancement of the phase of the counter 11.

The situation where the phase of the output of the counter 12 lags that of the counter 11 will next be considered. For this situation, the sign signal S is 0, and the right side of FIG. 3 is applicable. It will be understood that the input to $B_2$ of the counter 11 is now merely the $B_1$ output which will be the same as the input to $B_2$ of the counter 12, except that a pulse will be omitted at each location corresponding to a pulse $f_m$, thereby causing a retardation in the phase of the output of the counter 12.

Operation of the fine in-phase detector 18 will now be described with reference to FIG. 4. The Q output 18a of a delay memory flip-flop $D_1$ is held in its true state (Q high) by a HOLD OFF signal from the medium in-phase detector 17 (FIG. 1) until that detector provides an in-phase detection. Until then, modulation by the modulator 13 (FIGS. 1 and 2) will continue, since NAND gate 15 in FIG. 1 will remain enabled; also, the in-phase detection logic network comprising a NAND gate 40 and a flip-flop $FF_1$ (consisting of two cross-coupled NAND gates) will remain ineffective. When the HOLD OFF signal is removed in response to an in-phase detection by the medium in-phase detector 17 (FIG. 1), the flip-flop $FF_1$ of the fine in-phase detector 18 in FIG. 4 will then become settable in response to the Boolean function $f_o C_1 \overline{C_2}$. The signal $C_1$ is derived directly from a higher frequency stage in the counter 11 than that employed for the medium in-phase detector 17, and the signal $\overline{C_2}$ is derived from the complementary side of the stage in the counter 12 corresponding to $C_1$ in the counter 11.

Figure 5:
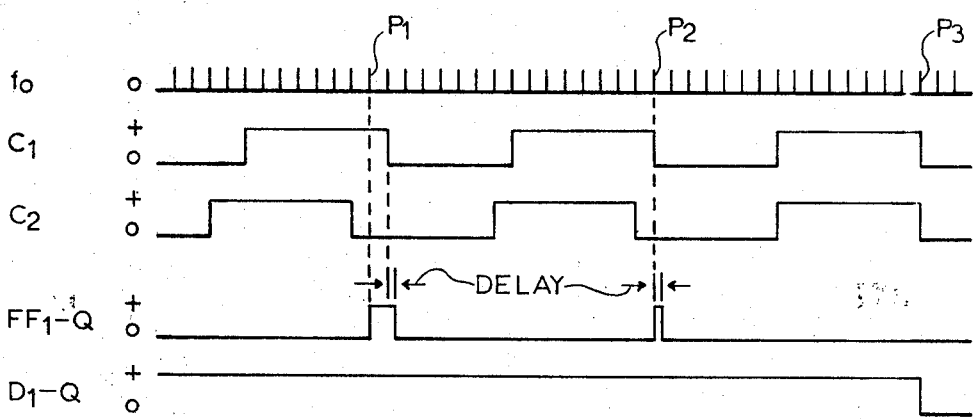
FIG. 5 is a timing diagram illustrating the operation of the fine in-phase detector of FIG. 4.

It will be understood that the function of $f_o C_1 \overline{C_2}$ will become true only when the signals $C_1$ and $C_2$ are out of phase. Therefore, as indicated by the timing diagram of FIG. 5 (where $\overline{C_2}$ leads $C_1$), the flip-flop $FF_1$ is set by a pulse $P_1$ of the signal $f_o$ via the NAND gate 40. Thereafter, the trailing edge of the signal $C_1$ resets the flip-flop $FF_1$ via two cascaded inverter NAND gates 41 and 42 which serve to provide an appropriate resetting delay as illustrated in FIG. 5. The inverted signal $C_1$ appearing at the output of the NAND gate 41 is differentiated by an RC network 43 to clock the delay memory flip-flop $D_1$, which may typically be a bistable circuit having a single input and an output equal to the input after it is clocked. Thus, the trailing edge of each signal $C_1$ serves to transfer the state of the flip-flop $FF_1$ into the flip-flop $D_1$ before the flip-flop $FF_1$ is reset.

It is to be noted that the function of the network 43 may be provided by appropriate design of the clock input of a delay memory flip-flop. It is shown here separately for clarity only. It is also to be noted that other types of flip-flops may be employed besides those indicated. The flip-flop $FF_1$ functions as a short term buffer memory for the in-phase indication provided by the NAND gate 40, while the flip-flop $D_1$ functions as a long term memory for continuous control from one in-phase test to another as those tests are performed by the NAND gate 40 once per cycle of the signal $C_1$.

Figure 4:
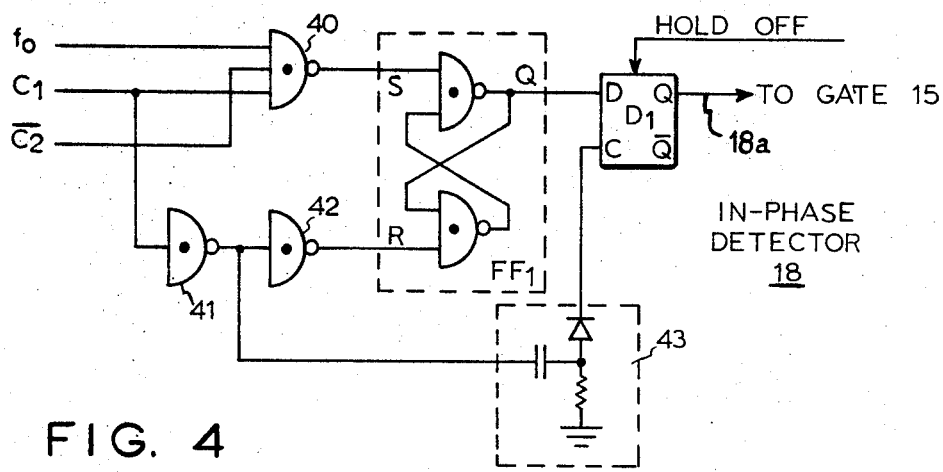
FIG. 4 is a logic diagram of a fine in-phase detector for the system of FIG. 1.

In the typical operation of FIG. 4, the flip-flop $D_1$ initially remains in the set state when the HOLD OFF signal is removed. Such a condition continues as long as an out-of-phase condition is detected by the NAND gate 40 and stored in the flip-flop $FF_1$, since only setting signals will be transferred to the delay memory flip-flop $D_1$ in response to the trailing edge of $C_1$. The timing diagram of FIG. 5 illustrates how the phase difference between signals $C_1$ and $C_2$ is typically reduced by $f_o$ pulses occurring at $P_1$ and $P_2$ as a result of the continuing set state of the memory delay flip-flop $D_1$ enabling NAND gate 15 in FIG. 1 so as to permit modulation to occur. As also illustrated in FIG. 5, when the $f_o$ pulse occurs at $P_3$, the phase difference is sufficiently small so that the function $f_o \cdot C_1 \cdot \overline{C_2}$ will not become true. The state of the flip-flop $FF_1$ will thus remain false, causing a false state to be transferred to the flip-flop $D_1$, thereby disabling the NAND gate 15 in FIG. 1 to terminate the modulating operation of the modulator 13. Although FIG. 5 illustrates operation for the situation where $C_2$ leads $C_1$, it will be understood that analogous operation occurs for the situation where $C_2$ lags $C_1$.

Next to be considered is the operation of the sign block 49 in FIG. 1 for detecting the sign of the phase difference between the outputs $C_{13}$ and $C_{23}$ of the counters 11 and 12. It will be understood that operation may be conventional such that, if the signal $C_{23}$ leads the signal $C_{13}$, the phase difference may be considered to be positive. The circuit of block 49 then provides a true signal S to the modulator 13 (FIG. 2) to cause advancement of the phase of the signal $C_{13}$. If the phase difference is negative, the circuit of block 49 then applies a false signal S to the modulator 13 to retard the phase of the signal $C_1$. In its simplest form, the sign detecting circuit 49 may be implemented by two binary stages $B_7$ and $B_8$ controlling a memory delay flip-flop $D_4$. Stages $B_7$ and $B_8$ respond to the respective signals $C_{13}$ and $C_{23}$ to provide output signals $C_{13}/2$ and $C_{23}/2$ which are respectively applied to the logic and clock inputs D and C of the delay memory flip-flop $D_4$. Consequently, the flip-flop $D_4$ will be set or reset to provide the appropriate state for signals S depending upon whether the signal $C_{13}$ leads or lags the signal $C_{23}$.

It is to be noted that the frequencies of the signals $f_o$, $f_m$, and $C_1$ and $C_2$ are appropriately chosen so that the in-phase detector 18 operates sufficiently faster than the counter 11 can be modulated so that, when an in-phase detection of the signals $C_1$ and $C_2$ is indicated by the fine in-phase detector 18, modulation can be halted before the next modulating pulse can occur. Also, the phase relationship between the pulse trains $f_o$ and $f_m$ are appropriately chosen so as to provide the operation illustrated in the graphs of FIGS. 3 and 5. For example, the signal $f_o$ may be at a frequency of 1 MHz., and the sampling frequency $f_{s1}$ of the signals $C_1$ and $\overline{C_2}$ may be selected to be at 50 kHz. The modulating signal may then be at any convenient frequency less than 50 kHz., such as 40 kHz.

The medium in-phase detector 17 of FIG. 1 will now be described with reference to FIG. 6. It will be understood that, similar to the fine in-phase detector 18, complementary counter signals $C_{12}$ and $\overline{C_{22}}$ are employed for phase detection, except that signals $C_{12}$ and $\overline{C_{22}}$ have a sampling frequency $f_{s2}$ of, for example, 5 kHz., which is considerably lower than the sampling frequency $f_{s1}$ of signals $C_1$ and $\overline{C_2}$, which is typically 50 kHz. as mentioned previously.

Figure 6:
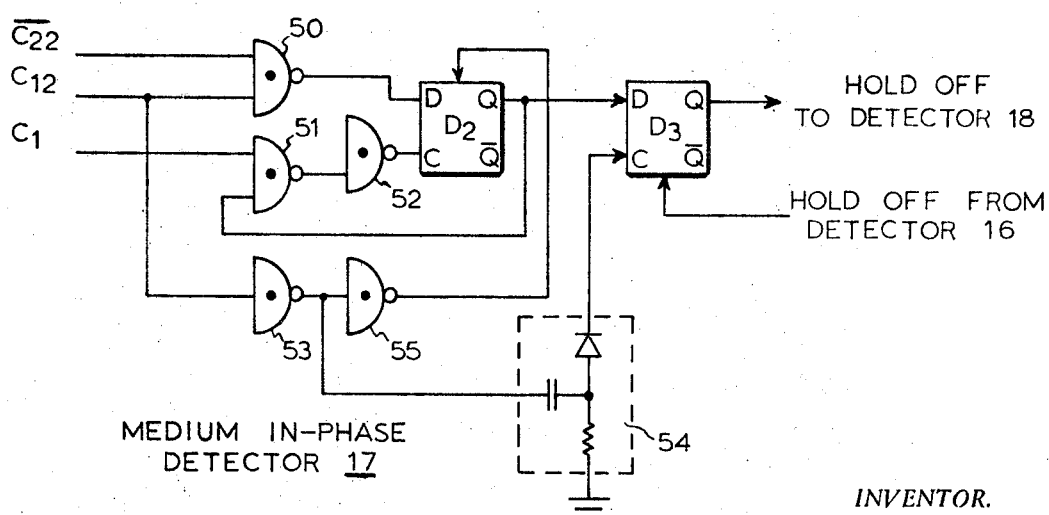
FIG. 6 is a logic diagram of a logical circuit which may be employed for the medium and coarse in-phase detectors of the system of FIG. 1.

The operation of the medium in-phase detector 17 of FIG. 6 is similar to that of the fine in-phase detector 18 of FIG. 4. More specifically, when the HOLD OFF signal from the coarse in-phase detector 16 in FIG. 1 is removed from the flip-flop $D_3$ of the medium in-phase detector 17 in FIG. 6 as a result of the detector 16 detecting an in-phase condition, the flip-flop $D_3$ remains set as long as an out-of-phase condition exists between signals $C_{12}$ and $\overline{C_{22}}$. This out-of-phase condition is detected by NAND gate 50 and flip-flop $D_2$ according to the function $C_1 \cdot C_{12} \overline{C_{22}}$; the signal $C_1$ is also applied as a clock signal to the flip-flop $D_2$ via NAND gates 51 and 52. When the phase difference between signals $C_{12}$ and $\overline{C_{22}}$ is sufficiently reduced, the flip-flop $D_2$ remains reset. Thus, when the signal $C_{12}$ returns to a false or low level, the positive going step appearing at the output of the NAND gate 53 is differentiated by a network 54 to provide a clocking signal for the flip-flop $D_3$ so as to transfer thereto the reset state from the flip-flop $D_2$, thereby removing the HOLD OFF signal from the fine in-phase detector 18. The flip-flop $D_2$ is preset after each transfer via a NAND gate 55. Also, the Q output of the flip-flop $D_2$ is applied to NAND gate 51 to prevent clocking at unwanted times. A timing diagram for operation of the logic network of FIG. 6 is not shown, since it would be similar to the previously described timing diagram of FIG. 4, with the signals $C_1$, $C_{11}$, $C_{12}$, $D_2$-Q and $D_3$-Q in FIG. 6 acting in a similar manner to the respective signals $f_o$, $C_1$, $C_2$, $FF_1$-Q and $D_2$-Q in FIG. 4.

The coarse in-phase detector 16 in FIG. 1 is constructed and arranged in a manner similar to the medium in-phase detector 17 of FIG. 6 described above, except that it does not receive a HOLD OFF signal and employs signals $C_{13}$ and $\overline{C_{23}}$ having a still lower sampling frequency such as 1 kHz. The coarse in-phase detector 16 also employs a signal $C_3$ of a frequency of, for example, 10 kHz. The signal $C_3$ is used as a triggering signal in the same manner as the signal $f_o$ in the fine in-phase detector 18 of FIG. 4 and the signal $C_1$ in the medium in-phase detector 17 of FIG. 6. The detailed construction and arrangement of an appropriate embodiment of the coarse in-phase detector 16 is thus readily evident and will not be further considered herein.

It will be understood that, although three successively releasable in-phase detectors have been illustrated in the exemplary embodiment disclosed herein, a greater or smaller number of detectors may be provided depending upon the particular application involved. The number of in-phase detectors to be provided and their characteristics are preferably chosen in accordance with the following equations:

$$f_{s1} > f_m \qquad (1)$$

$$R_1 = 1 \qquad (2)$$

$$f_{sn} > \cfrac{f_m}{\cfrac{f_0}{f_{s(n-1)}} - R_{n-1}} \qquad (3)$$

$$\frac{f_m}{f_{sn}} < R_n \frac{f_0}{f_{s(n-1)}} - R_{n-1} \qquad (4)$$

$$f_{tn} = f_s \cdot \frac{0.5}{R_n/J_n} \qquad (5)$$

The character $n$ in the above equations denotes the in-phase detector stages such that $n=1$ corresponds to the highest resolution detector, $n=2$ the next highest resolution detector, and so on. The character $f_{tn}$ denotes the frequency of the triggering signals used in the in-phase detectors, these being $f_o$ in the fine in-phase detector 18, $C_1$ in the medium in-phase detector 17, and $C_3$ in the coarse in-phase detector 16. The character R in the above equations denotes the band (i.e., the number of pulses of the triggering signal) within which the respective in-phase detector indicates an in-phase condition. The character $J_n$ denotes the total number of triggering pulses in a cycle of the respective sampling frequency $f_{sn}$. The characters $f_o$ and $f_m$ are respectively the source pulse train frequency and the modulation pulse train frequency, as described previously.

Equations (1) and (2) above are based on the provision of a resolution for the fine in-phase detector 18 within a single pulse of the triggering pulse train $f_o$ so as to permit termination of the modulation in response to an in-phase detection before the occurrence of the next modulator pulse. Equation (3) is based on the recognition that, in order to prevent overshoot, an in-phase detector should operate to provide at least one sampling before the triggering pulses used in the next higher frequency detector can be modulated one full cycle minus one pulse. Equation (4) requires that an in-phase detector operate so that modulation from just out-of-band, through in-band, and out-of-band again cannot occur before at least one sample occurs, and so that an in-band condition will be within the allowable region for unambiguous operation of the previous detector.

The following example will illustrate the use of the above equations to determine $f_{sn}$ and $f_{tn}$ for each detector based on selected values of $R_n$, and assuming $f_o$ and $f_m$ are 1 MHz. and 40 kHz. respectively. The corresponding equations used in each calculation are indicated in parentheses on the right.

Fine In-Phase Detector 18

Select $f_{s1}$=50 kHz. which is >40 kHz.     (1)
Also select $R_1$=1     (2)

Then $$f_{t1} = 50 \text{kHz.} \cdot \frac{0.5}{1/20} = 1 \text{mHz.} = f_o \quad (5)$$

Medium In-Phase Detector 17

$$f_{s2} > \frac{40}{\frac{1 \text{ mHz.}}{50 \text{ kHz.}} - 1} = \frac{40}{20-1} = \frac{40}{19} \quad (3)$$

Select $f_{s2}$=5 kHz.

$$8 = \frac{40 \text{ kHz.}}{5 \text{k Hz.}} < R_2 < \frac{1 \text{ mHz.}}{50 \text{ kHz.}} - 1 = 19 \quad (4)$$

Select $R_2$=10

Then $f_{t2} = 5 \text{ kHz.} \cdot \frac{0.5}{10/200} = 50 \text{ kHz.}$     (5)

Coarse In-Phase Detector 16

$$f_{s3} > \frac{40}{\frac{1 \text{ mHz.}}{5 \text{ kHz.}} - 1} = \frac{40}{200-1} = \frac{40}{199} \quad (3)$$

Select $f_{s3}$=1 kHz.

$$40 = \frac{40 \text{ kHz.}}{1 \text{ kHz.}} < R_3 < \frac{1 \text{ mHz.}}{5 \text{ kHz.}} - 10 = 190 \quad (4)$$

Select $R_3$=50

Then $f_{t3} = 1 \text{ kHz.} \cdot \frac{0.5}{50/100} = 10 \text{ kHz.}$     (5)

Although the present invention has been described in connection with a particular illustrated embodiment, it is to be understood that many variations and modifications in construction and arrangement are possible without departing from the scope of the present invention as defined by the appended claims.

I claim:

1. In combination:

first and second counters, each having an equal number of counting stages;

a pulse source coupled to said counters for applying a train of pulses thereto in parallel;

phase detection means for providing in succession a plurality of different resolutions of in-phase operation of said counters from a coarse to a fine resolution and for producing a first control signal indicating an out-of-phase condition until an in-phase operation is reached within said fine resolution;

lead-lag detection means for providing an indication of the relative phase of said second counter signal indicating the lead-lag condition of said second counter to said first counter; and modulation means response to said second control signal for modulating the pulses applied to said first counter from said pulse source to reduce the relative phase difference between said counters until said first control signal no longer indicates an out-of-phase condition.

2. The invention in accordance with claim 1, wherein the resolution capability of the finest resolution is within one pulse cycle period of pulses from said source.

3. The invention in accordance with claim 2, wherein said modulation means provides for modulation of the pulses applied to said first counter from said source by interjecting additional pulses in said pulse train in order to advance the phase of said first counter and interrupting pulses in said pulse train in order to retard the phase of said first counter.

4. The invention according to claim 1 wherein said phase detection means provides for each of said different resolutions of in-phase operation of said counters a means for comparing the phases of corresponding stages selected for a given resolution having equal output signal frequencies greater than corresponding stages selected for resolutions which are more coarse than said given resolution, and wherein said lead-lag detection means provides the relative phase of said second counter to said first counter based upon the relative phase of output signals from corresponding stages selected for the most coarse of said plurality of resolutions.

5. The invention according to claim 4 wherein said phase comparing means for a given resolution provides an out-of-phase indication until an out-of-phase indication is no longer present in a phase comparing means for a more coarse resolution, and said phase comparing means for the finest resolution produces said first control signal until both an out-of-phase indication is no longer present in the phase comparing means of the next finest resolution and an out-of-phase indication is no longer present in said comparing means for the finest resolution.

6. The invention according to claim 1 wherein said phase detection means provides for each of said plurality of different resolutions comparing the phase of a signal derived from a stage of said first counter with a signal derived from a corresponding stage of said second counter at a time determined by a synchronized signal at a higher frequency; and wherein said lead-lag detection means provides the relative phase of said second counter with respect to said first counter based upon the relative phases of output signals from corresponding stages selected for comparison in the most coarse of said plurality of resolutions.

7. The invention according to claim 6 wherein said phase comparing means for a given resolution is adapted to provide an out-of-phase indication until an out-of-phase indication is no longer present in a phase comparing means for a more coarse resolution, and said phase comparing means for the finest resolution produces said first control signal until both an out-of-phase indication is no longer present in the phase comparing means of the next finest resolution and an out-of-phase indication is no longer present in said comparing means for the finest resolution.

8. The invention according to claim 7 wherein said comparing means for the finest resolution comprises:

means for forming the logic function $f_o \cdot C_1 \cdot \overline{C_2}$, where $f_o$ represents the train of pulses from said pulse source, $C_1$ represents one of said signals being compared and $\overline{C_2}$ represents the binary complement of the other one of said signals being compared;

bistable storage means;

means responsive to said function $f_o \cdot C_1 \cdot \overline{C_2}$ at the end of each period of one of said signals being compared for setting and storage means when said function is true and for resetting said storage means when said function is false, thereby producing said first control signal while said storage means is set; and means for holding said storage means set until said comparing means for the next lower resolution is no longer indicating an out-of-phase condition.

9. The invention according to claim 8 wherein said comparing means for each resolution more coarse than the finest resolution comprises:

means for forming the logic function $f_n \cdot C_{1n} \cdot \overline{C_{2n}}$ where $f_n$ represents a signal at a higher frequency than signals being compared of corresponding stages of said first and second counter, $C_{1n}$ represents one of said signals being compared and $\overline{C_{2n}}$ represents the binary complement of the other one of said signals being compared;

bistable storage means; and means responsive to said function $f_n \cdot C_{1n} \cdot \overline{C_{2n}}$ at the end of each period of one of said signals being compared for setting said storage means when said function is true and resetting said storage means when said function is false, thereby indicating an out-of-phase condition;

and wherein said comparing means for each resolution more coarse than the finest resolution, except the most coarse resolution, includes means for holding said storage means thereof set until said comparing means for the next lower resolution is no longer indicating an out-of-phase condition.

PO-1050
(5/69)

UNITED STATES PATENT OFFICE
CERTIFICATE OF CORRECTION

Patent No. 3,578,956  Dated May 18, 1971

Inventor(s) Amiel J. McCall

It is certified that error appears in the above-identified patent and that said Letters Patent are hereby corrected as shown below:

Column 2, Line 34  "$\overline{f_m}$" should be -- $f_m$ --

Column 6, Line 16  After "counter" insert -- to said first counter and for producing a second control --

Signed and sealed this 19th day of October 1971.

(SEAL)
Attest:

EDWARD M. FLETCHER, JR.  ROBERT GOTTSCHALK
Attesting Officer  Acting Commissioner of Patents